Sept. 16, 1969  R. G. BERNARD  3,467,398
SEAL ASSEMBLIES

Filed Dec. 1, 1967  3 Sheets-Sheet 1

Sept. 16, 1969 R. G. BERNARD 3,467,398
SEAL ASSEMBLIES
Filed Dec. 1, 1967 3 Sheets-Sheet 2

United States Patent Office 3,467,398
Patented Sept. 16, 1969

3,467,398
SEAL ASSEMBLIES
Rene G. Bernard, Lyon, France, assignor to Societe d'Etudes Verrieres Appliquees (S.E.V.A.), Neuilly-sur-Seine, France, a company of France
Continuation-in-part of application Ser. No. 559,763, June 23, 1966. This application Dec. 1, 1967, Ser. No. 687,316
Claims priority, application France, June 28, 1965, 3,218; Nov. 23, 1965, 3,241
Int. Cl. F16j 15/16, 15/00
U.S. Cl. 277—180                              14 Claims

ABSTRACT OF THE DISCLOSURE

A seal assembly including two ring members of a resilient material which, when not in use, clamp between them, with a predetermined compression force, a ring of soft metal. In use, the seal assembly is clamped between two flanges and the soft metal ring is constrained to flow and form a seal between the flanges. The ring may be of substantially less thickness than the ring members.

---

This is a continuation-in-part of application 559,763, filed June 23, 1966 and now abandoned.

This invention relates to fluid-tight seals.

Seal assemblies which are employed to provide a seal between two members are generally of an elastomer or other resilient material. However, such seals are unsuitable when the members must be subjected to high temperatures, as, for example, when they form part of an enclosure in which there exists a high vacuum and which, as a result, has to be degased. Metallic seals must then be employed.

Metallic seals commonly used up to the present time have taken the form of a simple ring of malleable metal which is often cut from a single sheet of metal.

According to the present invention there is provided a seal assembly comprising two resilient metal ring members, one of said members being arranged radially within the other, and a deformable soft metal ring compressed between the two ring members.

When the seal assembly in accordance with the invention is placed between two members, for example between two flanges, and the flanges are forced towards one another, the soft metal ring is flattened and transversely presses radially against the two ring members and thereby becomes radially deformed in a resilient manner until the thickness of the ring becomes equal to that of the ring members.

If the flanges are subsequently released, the pressure exerted by the latter on the soft metal ring disappears whereas that exerted by the ring members remains and gives rise to the restoration of the original shape of the ring so that a fresh equilibrium of lateral pressures is attained.

This process is reversible, that is to say that, if the seal assembly is again compressed between the flanges, the seal ring again takes up the state which it had before the first compression and ensures a seal once again so that the seal assembly is re-usable.

It is necessary, when tightening and untightening the seal, that the material of the ring members is always within their elastic limits, that is to say that the local forces resulting from a change in their internal or external diameters (according to the ring member considered) again comes within elastic limits in order that the deformation of the ring members shall be reversible. In contrast, the ring of soft metal must be able to deform plastically, so as to be considered as a viscous liquid.

In practice, the soft ring must have an elastic limit lower than 10 kilograms/sq. mm. It may, for example, be of aluminum, of gold, of copper, of silver, of tin or of lead, or zinc, of cadmium or of an alloy of these metals.

For their part, the resilient ring members must have as high an elastic limit as possible, higher than 10 kilograms/sq. mm., and preferably higher than 30 kilograms/sq. mm.; an elastic limit may be attained with certain alloys or metals of 70 or of even 120 kilograms/sq. mm.

Generally it is advantageous that the ratio of the elastic limits of the metal of the ring members and of the soft metal should be higher than 5, this ratio reaching eventually a value of from 30 to 50. The elastic ring members may thus be of steel, of nickel, of an alloy with a nickel base, such as that known in commerce under the name of "Monel" or "Monel K," of bronze, of beryllium, of molybdenum, of tungsten, of a light alloy such as those known in commerce under the name AZ5GU and AZ8GU which have a base of magnesium and copper and contain 5 to 8 percent of zinc, or alternatively of a known alloy under the name TA6V which is an alloy of titanium containing as its principal addition 6% of vanadium.

When the seal assembly in accordance with the present invention, is used to provide a seal between two members in contact with a corrosive fluid, the deformable ring and ring members may be of metals resistant to this fluid. In a modification, the deformable ring and/or the ring members are covered with a protective layer after the deformable ring has been compressed between the ring members. In this manner, the protective layer itself is subjected to fairly small deformations in the course of the use of the seal assembly so that it is able to prevent the deformable ring and ring members from becoming detached.

The soft metal of which the deformable ring is constituted has a tendency to flow into the space existing, at the beginning of the tightening operation, between the resilient ring members and the flanges, and thus to form an annular pad contiguous to each of the clamping faces of the seal. When this flow has become sufficiently pronounced and when a fresh clamping is effected, it may happen that in practice no further resilient compression of the deformable ring is possible so that the imperviousness of the seal is adversely effected.

According to a complementary characteristic of the invention, which overcomes this risk, each of the ring members includes a projecting lip, on each of its clamping faces at its side which is adjacent the ring. Moreover, at the time of loosening the seal, the force exerted on the soft metal acting to compress it is radial and in the median plane of the ring. However, the equilibrium obtained is unstable so that the dismantled seal is no longer planar but is deformed to a dish shape.

The contour of the unclamped seal is not disadvantageous when the seal is of small diameter. However, it becomes significant when the diameter is relatively large since it renders handling of the seal assembly difficult. The deformable ring has a tendency to escape from the members especially when the latter are deformed to frusto-conical shapes of which the apex angles may be perhaps different. This disadvantage is particularly important when the seal is used in a valve since the increase in the distance by which it is necessary to separate the clamping surfaces of the seal in order to allow free circulation through this seal complicates substantially the clamping mechanism.

According to another embodiment of the invention which prevents such distortion there are included between two ring members, two rings of soft metal or soft metal alloy which are disposed one above the other, and means for maintaining these two rings spaced from one another.

The spacing means may be rigid with one of the ring members. They may also be constituted by a third ring member, and the latter may be of any material whatsoever. Possibly it may be of the same metal or alloy as the soft rings.

In order to limit the growth of the present assembly when it is disassembled, it is sufficient to increase the transverse moment of inertia of the ring members, that is to say to increase their thickness. But it is desirable, in order to avoid complications in the manufacture of the seal assembly, to avoid increasing the thickness of the soft ring.

To this end, according to a complementary characteristic of the invention, both of the ring members have a thickness in excess of that of the deformable ring, and project from both sides of the deformable ring to define two annular grooves at right angles this ring, and each of the two flanges comprises an annular projection capable of engaging, with clearance, in one of these grooves.

A channel may be provided at least in one of the faces of each ring member projecting with respect to the ring, at its edge adjacent the latter, so that the groove is of a larger size than the ring.

In an alternative form, one only of the ring members has at least, at its part spaced from the deformable ring, a thickness which is larger than that of this ring, its part adjacent the ring having, preferably, the same thickness as the ring, and one at least of the flanges comprises a groove intended to receive the portion of the ring member projecting with respect to the ring.

The present invention also relates to a method for manufacturing the above defined seal assembly.

Further according to the present invention there is provided a method manufacturing a seal comprising the steps of compressing a soft metallic ring between two concentric resilient metallic ring members, by clamping the ring and ring members between two plane surfaces, the initial free space between the ring members being less than the space occupied by the ring after clamping.

It is possible to use a closed ring. The ring may also be open or even be formed by several juxtaposed parts; in the latter case, when the ring is clamped between two plane walls it is deformed longitudinally in such a manner that its ends, or the ends of two adjacent parts are applied against one another under a high pressure and become welded together under the effect of this pressure.

Certain embodiments of fluid-tight seals in accordance with the invention will now be described, by way of example, with reference to the accompanying diagrammatic drawings, in which.

As is shown in FIGS. 1 to 4, the seal assembly is formed by a ring 1, of a soft metal or soft metal alloy, for example of aluminum, which is compressed transversely between two concentric ring members 2 and 3 of a resilient metal or metal alloy. The ring 1 has a lenticular cross-section and its thickness, at its median part, is larger than that of the ring members 2 and 3.

When the seal is clamped between two flanges or other clamping members 4a and 4b (FIG. 3), the thickness of the ring is reduced to that of the ring members 2 and 3 and its section becomes rectangular; the radial dimension changing from $d_1$ to $d_2$.

Figure 1:
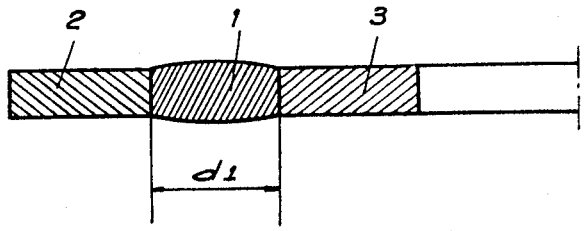
FIG. 1 shows a first embodiment of the present seal assembly in cross-section.
Figure 2:
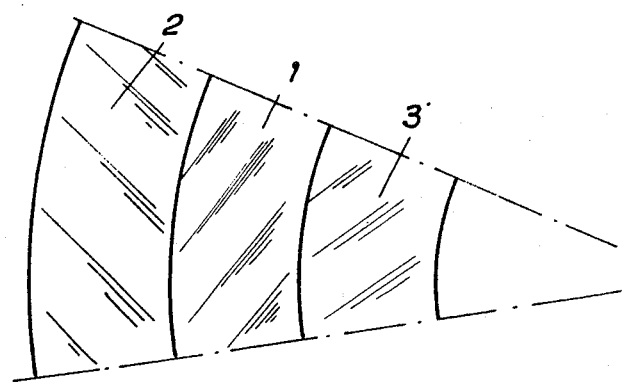
FIG. 2 is a fragmentary plan view of the seal assembly of FIG. 1.
Figure 3:
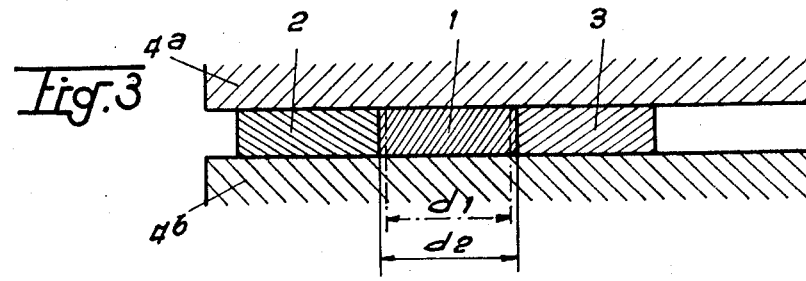
FIG. 3 shows the seal assembly of FIG. 1 after it is clamped between two flanges.

If the flanges 4a and 4b are loosened, the seal ring 1 swells and again takes up the form and dimensions as shown in FIG. 1. This cycle of tightening and loosening may be carried on indefinitely.

It will thus be seen that the ring members 2 and 3 confer on the ring 1 an "induced" elasticity constraining it to act as if it were formed not of a soft metal but of an elastomer or resilient material. However, the seal can be used at temperatures up to 500° C., for example for degassing, which would not be the case if the ring 1 were of an elastomer material. After heating to a temperature of this order there is no risk of failure, since the distance between the two flanges 4a and 4b increases as a result of the elongation of the clamping bolts (not shown), the elasticity of the ring members 2 and 3 causing swelling of the ring 1, which thus maintains fluid-tightness.

Figure 4:
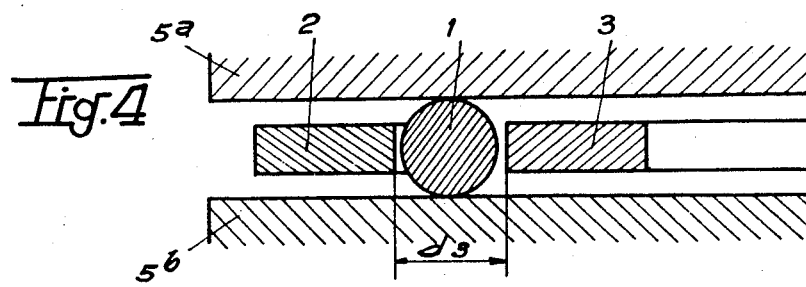
FIG. 4 illustrates how the seal assembly of FIG. 1 is formed.

In order to form the seal assembly which has just been described, it is possible, for example, to take an annular thread or wire of which the ends are simply joined and either chamfered, or cut perpendicularly to the length of the wire. This ring is placed between two ring members 2 ad 3 separated from one another by a distance $d_3$ which is larger than the diameter of the wire but less than the size of this wire after clamping that is to say $d_2$ (FIG. 4). Then this assembly is clamped between two plane walls 5a and 5b. The section of the wire may be of any desired section, for example rectangular. On the other hand, the ring members 2 and 3 are of a section dictated by the plastic deformation of the ring, provided that the distance which separates them does not exceed $d_2$.

The soft metal secured between the two flanges and the two resilient ring members, owing to its low elastic limit, acts as a very viscous liquid, that is to say it transmits substantially completely to the two ring members the pressure exerted upon it by the flanges. Finally, the pressures are distributed evenly over the walls, and the ring is in a state roughly equivalent to hydrostatic equilibrium when the plastic deformation is completed.

Thus, when the walls 5a and 5b are separated, which removes the pressure exerted on the upper and lower faces of the deformable ring, the pressures exerted laterally on this ring by the ring members 2 and 3 remain and deform the ring plasticly. The ring members approach one another, the spacing which separates them falls to the value $d_1$ and the ring swells in order to resume the appearance shown in FIGURE 1.

Figure 5:
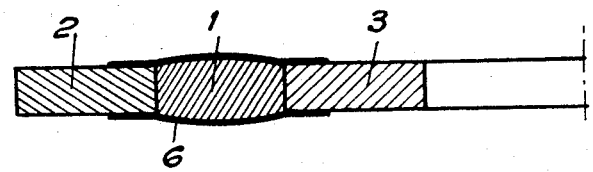
FIG. 5 is a view similar to FIG. 1 of a second embodiment.

In the second embodiment, shown in FIGURE 5, the deformable ring 1 which is, for example of aluminium, has been covered, after assembly of the seal, by a protective layer 6, for example of gold or nickel; this layer may be formed, for example, chemically or electrolytically.

In FIGURE 6, the ring 1 is again, of soft metal or metal alloy, which is compressed transversely between two concentric ring members 2 and 3 of a resilient metal or alloy. The ring 1 has a lenticular form and its thickness, at its centre, is larger than that of the ring members 2 and 3.

The radially-outer ring member 2 includes a thin lip 2a projecting outwardly at its inner edge, on each of its clamping faces. At the same time, the radially-inner ring member 3 includes a projecting lip 3a on its outer edge on each of its clamping faces. The lips 2a, 3a are directed towards the ring 1, that is to say that the lips 2a of the outer ring member are directed inwardly of the seal and the lips 3a of the inner ring member are directed outwardly.

Figure 7:
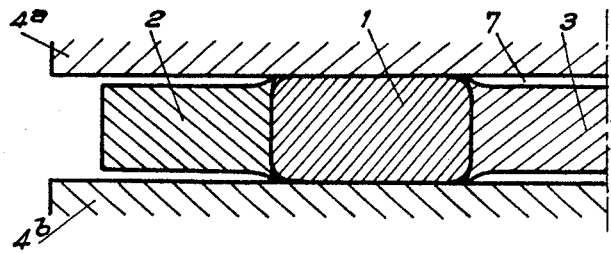
FIG. 7 is a view similar to FIG. 6 but showing the seal assembly in the process being clamped.
Figure 8:
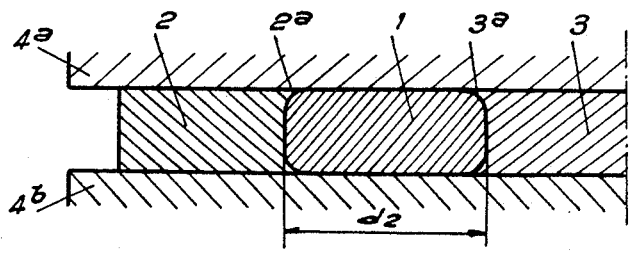
FIG. 8 is a view similar to FIG. 6, after completion of the clamping.

When the ring is compressed between two flanges 4a, 4b, the metal of the ring 1 progressively fills the annular space available between the lips and the ring, but these lips just come into contact with the flanges before the space is completely filled (FIG. 7). The compression continuing, the lips constitute barriers which prevent the metal of the ring from flowing into the space 7 still existing between the ring members 2 and 3 and the flanges 4a and 4b. On completion of the compression, the lips 2a, 3a are applied to the ring of which the dimension $d_1$ is now equal to $d_2$ (FIG. 8).

Figure 6:
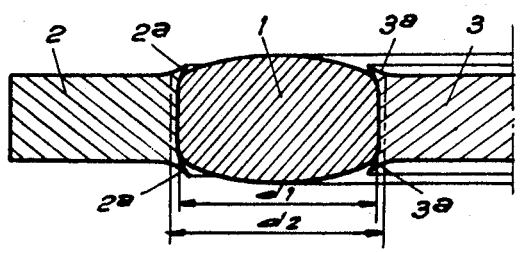
FIG. 6 is a cross-section of a third embodiment of the seal assembly before clamping.

When the pressure exerted by the flanges 4a and 4b is removed, the ring 1 swells under the effect of the lateral pressure exerted by the ring members 2 and 3 and again takes up its lenticular form. The lips 2a and 3a rise and the seal again takes on its initial form and dimensions (FIG. 6).

Figure 9:
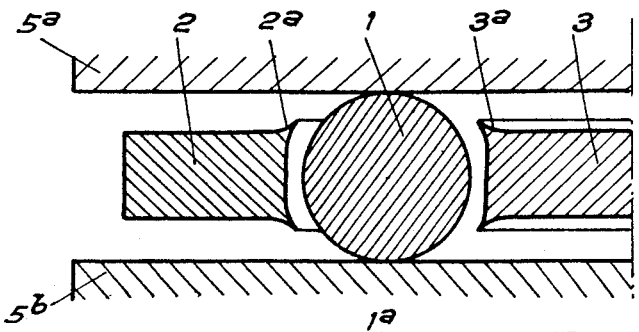
FIG. 9 illustrates the formation of the seal assembly of FIG. 6.

The seal which has just been described may be formed as indicated above. A toroidal wire of soft metal is placed between two ring members provided with lips, then clamped between the two plane walls 5a and 5b (FIG. 9). The toroid is squeezed and just comes into contact with the ring members 2 and 3, which centres them. Then it progressively fills the annular space still available between it and its lips, whilst pushing radially outwardly on the ring members, until this space is completely filled and the material of the ring 1 is under compression (FIG. 8).

The lips 2a and 3a may be formed by any normal machining process, spark erosion, stamping, or other shaping methods. However, it is advantageous to use a method which works the metal to a maximum extent in such a manner that the lips formed have a very high elastic limit; spinning or stamping are suitable for this purpose. It is thus, for example, that these processes enable the formation on a ring member of blued steel or stainless steel with an elastic limit of 70 kg./mm.$^2$, lips having an elastic limit of 110–130 kg./mm.$^2$, with an elongation which is still substantial. The lips are thus highly elastic without being fragile, to such an extent that they return readily to their normal shape when they have been flattened by the pressure exerted by the flanges in the course of clamping.

Figure 10:
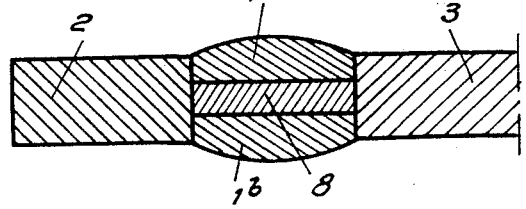
FIGS. 10 to 13 are views similar to that of FIG. 1 of other embodiments.

In the embodiment of FIG. 10, two identical ring elements 1a and 1b, of metal or metal alloy, are arranged between the two ring members 2 and 3, and are separated from one another by a spacer 8. This spacer may, for example, have the thickness of the ring members 2 and 3 and a size equal to that of the free space $d_3$ between these ring members before assembly.

The equilibrium of the forces in the dis-assembled seal is more stable than in embodiments described hereinbefore the thickness of the ring members 2 and 3 can be larger; moreover, the ring 1a tends to buckle the ring member in one sense and the ring 1b in the opposite sense.

Figure 11:
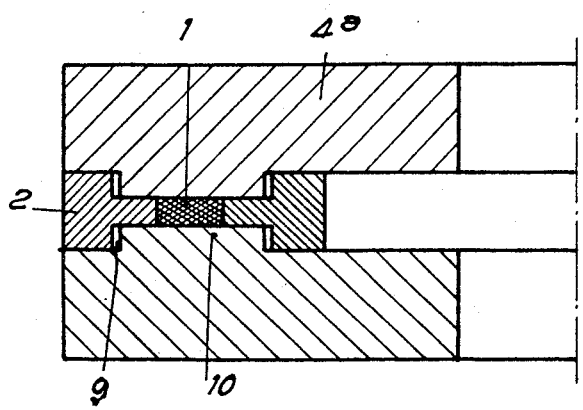

The embodiment of FIG. 11 is similar in its general concept to the above described embodiments, but each of the two ring members has a flange at its end farthest from the deformable ring which is thicker than the ring 1; a rectangular shoulder is provided by each of these flanges at its edge adjacent the deformable ring, and a groove 9 is thus formed between each of those edges above and below the deformable ring. Each of the flanges 4a and 4b has an annular projection 10 engaged in the corresponding groove 9.

Figure 12:
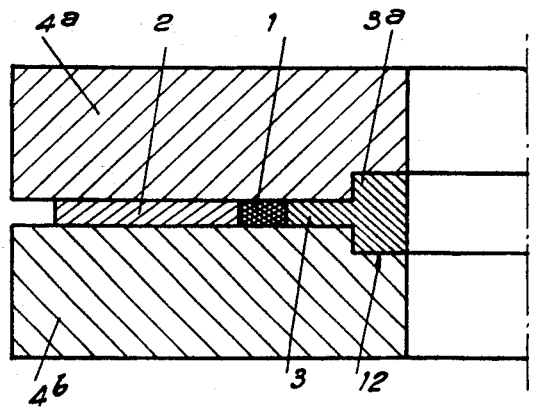

In the embodiment of FIG. 12, the ring member 2 has the same height as the ring 1; in contrast, the ring member 3 has at a portion spaced from the deformable ring 1 which is thicker than that ring, thus projecting from both sides of the latter as indicated at 3a. Each of the projections 3a is engaged in a groove 12 provided on the internal adjacent edges of the clamp or flange 4a and 4b.

Figure 13:
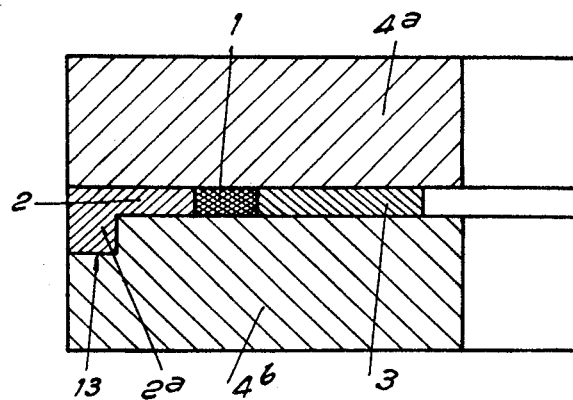

In the embodiment of FIG. 13, it is the external ring member 2 which has on one of its faces, a projection 2a engaged in a groove 13 provided in the external edge of the flange 4b.

The embodiments which have just been described with reference to FIGS. 11 to 13 are of particular interest when the radial space available for locating the seal is too restricted for locating a flat seal; in effect, by increasing the thickness of one ring member, it is possible to reduce its width.

I claim:

1. A composite integral seal assembly for providing a seal between two surfaces on either side of said assembly comprising two resilient metallic ring members, one of said members being disposed radially within the other, and a deformable metallic solid ring engaged by and positioned between said ring members, wherein the ratio of the elastic limits of the materials of said resilient ring members and said deformable ring is at least 5, and the maximum axial thickness of said deformable ring is far enough in excess of the axial thickness of the portions of said resilient rings adjacent to said deformable ring that when said two surfaces are urged together, so that said surfaces substantially contact said portions of said resilient rings adjacent to said deformable ring and the axial thickness of said deformable ring is laterally compressed to substantially the same axial thickness of said portions of said resilient rings adjacent to said deformable ring, the deformable ring is stressed beyond its elastic limit to push said resilient rings farther apart in opposite radial directions so that when said surfaces are no longer urged together lateral compression of said deformable ring is relieved and said resilient rings return said deformable ring to its original shape under the effect of the residual stress in said resilient rings.

2. A seal assembly according to claim 1, wherein said ring is of lenticular cross-section.

3. A seal assembly according to claim 1 wherein said deformable metallic ring comprises:
   two, soft metallic solid ring elements interposed between said resilient ring members, and
   means spacing said metallic ring elements axially,
   said spacing means and the soft metallic ring elements together having a maximum axial thickness far enough in excess of the axial thickness of the ring members and the elastic limits of said ring elements being low enough that when said surfaces are urged together so that the axial thickness of said deformable metallic ring is substantially the same as the adjacent portions of said resilient rings, the elastic limits of said ring elements are exceeded.

4. An assembly according to claim 1, wherein each of said resilient ring members has a pair of lips,
   the lips of each resilient member extending substantially towards those of the other ring member, and
   said lips being arranged to confine the flow of the metallic material of said deformable ring when the assembly is clamped in its operative position.

5. An assembly according to claim 4 wherein the lips are directed substantially towards the deformable ring.

6. An assembly according to claim 1, wherein the material of the deformable ring is selected from the group consisting of aluminium, gold, copper, silver, tin, zinc, cadmium, lead and alloys of these metals.

7. An assembly according to claim 1, wherein the material of the ring members is selected from the group consisting of nickel, molybdenum, steel, nickel alloy, bronze, beryllium, tungsten, light alloys and titanum alloys.

8. An assembly according to claim 1 further comprising wherein one of the resilient ring members has remote from the deformable ring, a portion having a thickness greater than that of the deformable ring, said portion being adapted to extend into a groove on one of said surfaces.

9. An assembly according to claim 8 wherein said thickened portion of said one ring member remote from the deformable ring projects axially from both sides of said ring and wherein said axial projections are adapted to project into annular grooves on each of said two surfaces.

10. An assembly according to claim 1 wherein both of said ring members have remote from the deformable ring a portion thicker than that of said deformable ring, said portion projecting from both sides of said ring to define two grooves,
  each of said grooves being adapted to be engaged with lateral clearance by a projection on its corresponding surface.

11. An assembly according to claim 10 wherein the part of each of said resilient ring members adjacent the deformable ring has the same thickness as the ring when the seal assembly is pressed between two flat surfaces.

12. An assembly according to claim 1, wherein the elastic limit of the material of the resilient ring members is at least 10 kg./mm.$^2$.

13. An assembly according to claim 1, wherein the elastic limit of the material of the resilient ring members is at least 30 kg./mm.$^2$.

14. An assembly according to claim 1, wherein the elastic limit of the deformable ring is less than 10 kg./mm.$^2$.

References Cited

UNITED STATES PATENTS

| | | |
|---|---|---|
| 1,825,962 | 10/1931 | Laird. |
| 2,599,767 | 6/1952 | Long _____ 277—180 X |
| 2,681,165 | 6/1954 | Kornhauser et al. ___ 220—46 X |
| 2,699,349 | 1/1955 | Brownlee _____ 277—231 |
| 2,840,262 | 6/1958 | Learmonth et al. ___ 277—188 X |
| 2,914,350 | 11/1959 | Smith. |

FOREIGN PATENTS

| | | |
|---|---|---|
| 565,642 | 12/1932 | Germany. |
| 937,707 | 9/1963 | Great Britain. |
| 952,478 | 3/1964 | Great Britain. |

SAMUEL ROTHBERG, Primary Examiner

U.S. Cl. X.R.

277—188, 198, 235